United States Patent [19]
Jibbe et al.

[11] Patent Number: 5,179,704
[45] Date of Patent: Jan. 12, 1993

[54] METHOD AND APPARATUS FOR GENERATING DISK ARRAY INTERRUPT SIGNALS

[75] Inventors: Mahmoud K. Jibbe; Craig C. McCombs, both of Wichita, Kans.

[73] Assignee: NCR Corporation, Dayton, Ohio

[21] Appl. No.: 668,641

[22] Filed: Mar. 13, 1991

[51] Int. Cl.$^5$ ............................................. G06F 13/00
[52] U.S. Cl. ................................. 395/725; 364/259.7; 364/DIG. 1; 364/947.4; 364/941; 364/DIG. 2
[58] Field of Search ............... 395/725, 425, 275, 325; 364/259.7, DIG. 1, 947.4, 941, DIG. 2

[56] References Cited

U.S. PATENT DOCUMENTS

| | | | |
|---|---|---|---|
| 4,086,627 | 4/1978 | Bennett et al. | 395/725 |
| 4,159,516 | 6/1979 | Henrion et al. | 395/725 |
| 4,413,317 | 11/1983 | Swenson | 364/200 |
| 4,420,806 | 12/1983 | Johnson, Jr. et al. | 395/725 |
| 4,768,149 | 8/1988 | Konopik et al. | 364/200 |
| 4,779,195 | 10/1988 | James | 395/275 |
| 4,817,035 | 3/1989 | Timsit | 364/900 |
| 4,885,683 | 12/1989 | Coogan | 364/200 |
| 4,933,846 | 6/1990 | Humphrey et al. | 395/725 |
| 4,953,072 | 8/1990 | Williams | 364/200 |
| 4,958,351 | 9/1990 | Flora et al. | 371/40.1 |
| 4,965,714 | 10/1990 | Knecht | 364/187 |

OTHER PUBLICATIONS

"A Case for Redundant Arrays of Inexpensive Disks (Raid)" by David A. Patterson, et al., University of California Report No. UCB/CSD 87/391, Dec. 1987.
"Parity Striping of Disc Arrays: Low-Cost Reliable Storage with Acceptable Throughput"; by Jim Gray, et al; Tandem Computers, Inc., Tandem Technical Report No. 90.2, Jan. 1990.

Primary Examiner—Michael R. Fleming
Assistant Examiner—Glenn A. Auve
Attorney, Agent, or Firm—James M. Stover

[57] ABSTRACT

An interrupt signal for a disk array is generated by selectively combining interrupt signals received from the individual disk drives and other interrupt signal sources within the disk array. The circuit for generating the array interrupt signal includes logic for combining a first group of selected interrupt signals to generate a group interrupt signal having a HIGH state when each one of the signals in the first group is at a HIGH state, and logic which combines a second group of selected interrupt signals to generate an independent interrupt signal having a HIGH state when any one of the interrupt signals of the second group is at a HIGH state. The group and independent interrupt signals are gated together through use of an OR gate to generate the disk array interrupt signal. The logic for generating the group and independent interrupt signals can be reconfigured to combine, pass or ignore interrupt signals as selected by the system user. The circuit includes filtering and latching mechanisms to prevent interference with an existing array interrupt signal during reconfiguration of the group or independent interrupt logic.

17 Claims, 13 Drawing Sheets

METHOD AND APPARATUS FOR GENERATING DISK ARRAY INTERRUPT SIGNALS

The present invention relates to disk array storage devices for computer systems and, more particularly, to the generation of interrupt signals for a disk array.

BACKGROUND OF THE INVENTION

Recent and continuing increases in computer processing power and speed, in the speed and capacity of primary memory, and in the size and complexity of computer software has resulted in the need for faster operating, larger capacity secondary memory storage devices; magnetic disks forming the most common external or secondary memory storage means utilized in present day computer systems. Unfortunately, the rate of improvement in the performance of large magnetic disks has not kept pace with processor and main memory performance improvements. However, significant secondary memory storage performance and cost improvements may be obtained by the replacement of single large expensive disk drives with a multiplicity of small, inexpensive disk drives interconnected in a parallel array, which to the host appears as a single large fast disk.

Several disk array design alternatives were presented in an article titled "A Case for Redundant Arrays of Inexpensive Disks (RAID)" by David A. Patterson, Garth Gibson and Randy H. Katz; University of California Report No. UCB/CSD 87/391, December 1987. The article, incorporated herein by reference, discusses disk arrays and the improvements in performance, reliability, power consumption and scalability that disk arrays provide in comparison to single large magnetic disks.

An additional disk array arrangement, referred to as parity striping, is presented in an article titled "Parity Striping of Disc Arrays: Low-Cost Reliable Storage with Acceptable Throughput" by Jim Gray, Bob Horst and Mark Walker; Tandem Computers, Inc., Tandem Technical Report No. 90.2, January 1990. In the parity striping system, only parity information is striped across the disks, but the parity is mapped as large contiguous extents. Data is not striped across the disks at all.

The individual magnetic disks utilized in the various disk array configurations discussed in the articles referred to above often provide individual interrupt signals, each interrupt signal indicating that a specific disk has completed an operation or encountered a problem. A method for combining these individual disk interrupt signals into a single system interrupt signal for notifying the host system processor that the array has completed its operation or encountered a problem is desired.

OBJECTS OF THE INVENTION

It is therefore an object of the present invention to provide a new and useful method and apparatus for generating disk array interrupt signals.

It is another object of the present invention to provide a new and useful architecture for combining individual disk interrupt signals to generate an interrupt signal for an array of disks.

It is yet another object of the present invention to provide such an architecture which can be readily modified to accommodate changes in the disk array configuration.

It is a further object of the present invention to provide such an architecture which provides interrupt service during such modifications.

It is also an object of the present invention to provide an easy and flexible method and apparatus to establish interrupt service among the channels of a disk array controller without software assist.

SUMMARY OF THE INVENTION

There is provided, in accordance with the present invention, a digital circuit for generating a system interrupt signal for a disk array by selectively combining interrupt signals provided by the individual disk drives and other interrupt signal sources within the disk array. The circuit includes two masking mechanisms for combining interrupt signals. A group interrupt masking mechanism combines a first group of selected interrupt signals to generate a group interrupt signal, the group interrupt signal having a first binary state when each one of the interrupt signals of the first group has a first binary state and having a second binary state otherwise. An independent interrupt masking mechanism combines a second group of selected interrupt signals to generate an independent interrupt signal, the independent interrupt signal having a first binary state when any one of the interrupt signals of the second group has a first binary state and having a second binary state when each one of the interrupt signals of the second set has a second binary value. The group and independent interrupt signals are gated together to generate the disk array system interrupt signal, the system interrupt signal having a first binary state when either one of the group or independent interrupt signals has a first binary state and having a second binary state when each of the group and independent interrupt signals has a second binary state.

In the described embodiment, the masking mechanisms can be reconfigured to combine, pass or ignore interrupt signals as selected by the system user. The described embodiment also includes filter circuitry to synchronize the generation of the system interrupt signal with an external system clock and latch circuitry to prevent interference with the existing system interrupt signal state during reconfiguration of the group or independent interrupt masking mechanism.

The above and other objects, features, and advantages of the present invention will become apparent from the following detailed specification when read in conjunction with the accompanying drawings in which applicable reference numerals have been carried forward.

DETAILED DESCRIPTION OF THE PREFERRED EMBODIMENT

Figure 1:
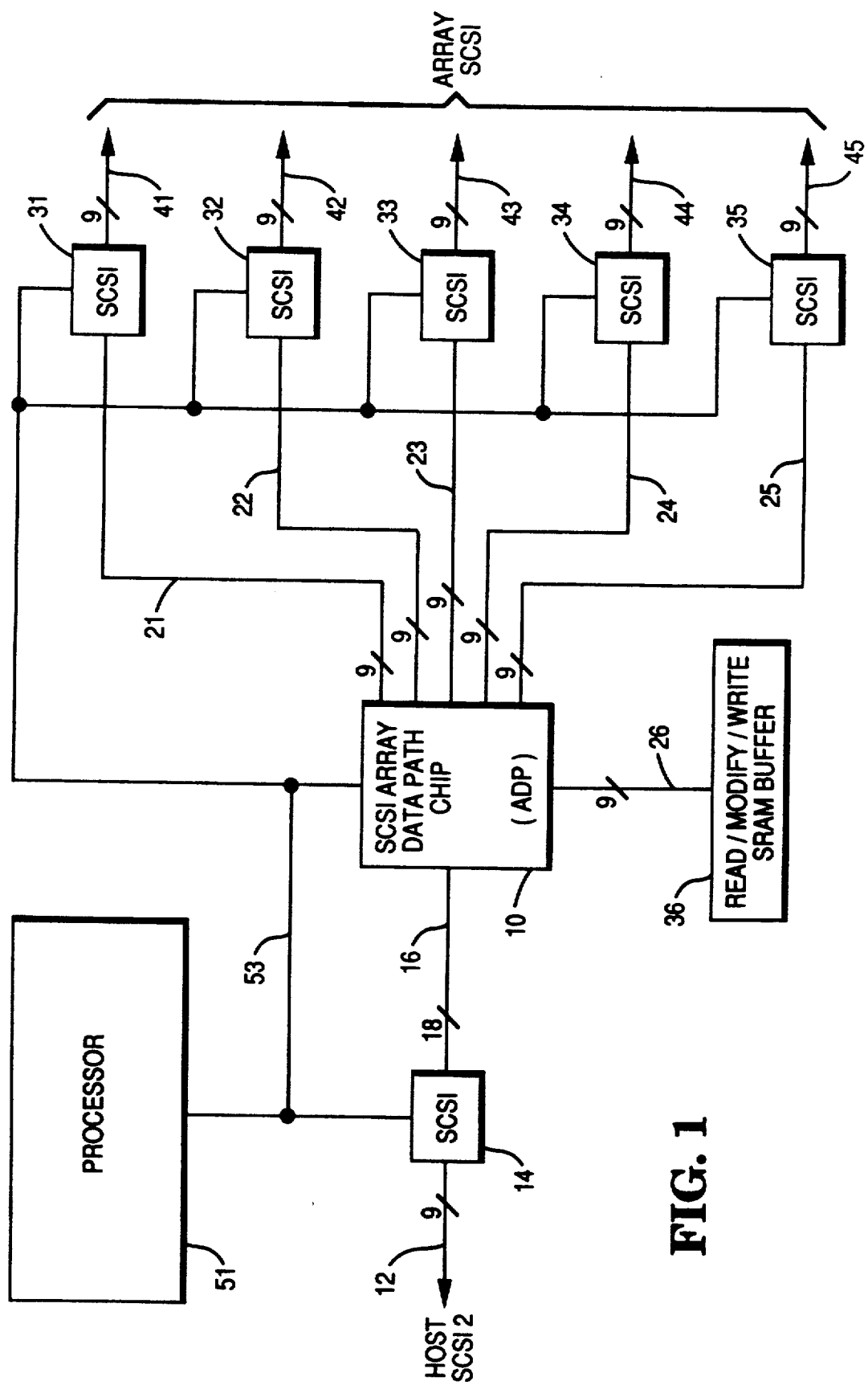
FIG. 1 is a block diagram of a disk array controller incorporating the interrupt generation architecture of the present invention.

Referring now to FIG. 1, there is seen a block diagram of a SCSI (small computer system interface) disk array controller incorporating the interrupt generation architecture of the present invention. The controller includes a host SCSI adapter 14 to interface between the host system data bus 12 and SCSI data bus 16. Parity generation and data and parity routing are performed within SCSI Array Data Path Chip (ADP) 10. ADP chip 10 interconnects SCSI data bus 16 with six additional data busses, identified by reference numerals 21 through 26. SCSI bus interface chips 31 through 35 interface between respective SCSI data busses 21 through 25 and corresponding external disk drive data busses 41 through 45. Bus 26 connects ADP chip 10 with a 64 kilobyte static random access memory (SRAM) 36. ADP chip 10, SCSI adapter 14 and SCSI bus interface chips 31 through 35 all operate under the control of a dedicated microprocessor 51.

All data busses shown, with the exception of bus 16, include nine data lines, one of which is a data bus parity line. Bus 16 includes eighteen data lines, two of which are bus parity lines. Additional control, acknowledge and message lines, not shown, are also included with the data busses.

SCSI adapter 14, SCSI bus interface chips 31 through 36, SRAM 36 and microprocessor 51 are commercially available items. For example, SCSI adapter 14 is a Fast SCSI 2 chip, SCSI bus interface chips 31 through 35 are NCR 53C96 chips and microprocessor 51 is a Motorola MC68020, 25 megahertz microprocessor. Also residing on the microprocessor bus are a one megabyte DRAM, a 128 kilobyte EPROM, an eight kilobyte EEPROM, a 68901 multifunction peripheral controller and various control and status registers.

SCSI data path chip 10 is an application specific integrated circuit device capable of handling all data routing, data multiplexing and demultiplexing, and parity generation and checking aspects of RAID levels 1, 3 and 5. Data multiplexing of non-redundant data among five channels is also accommodated. ADP chip 10 handles the transfer of data between host SCSI adapter 14 and SCSI bus interface chips 31 through 35. The ADP chip also handles the movement of data to and from the 64 kilobyte SRAM during read/modify/write operations of RAID level 5.

Figure 2:
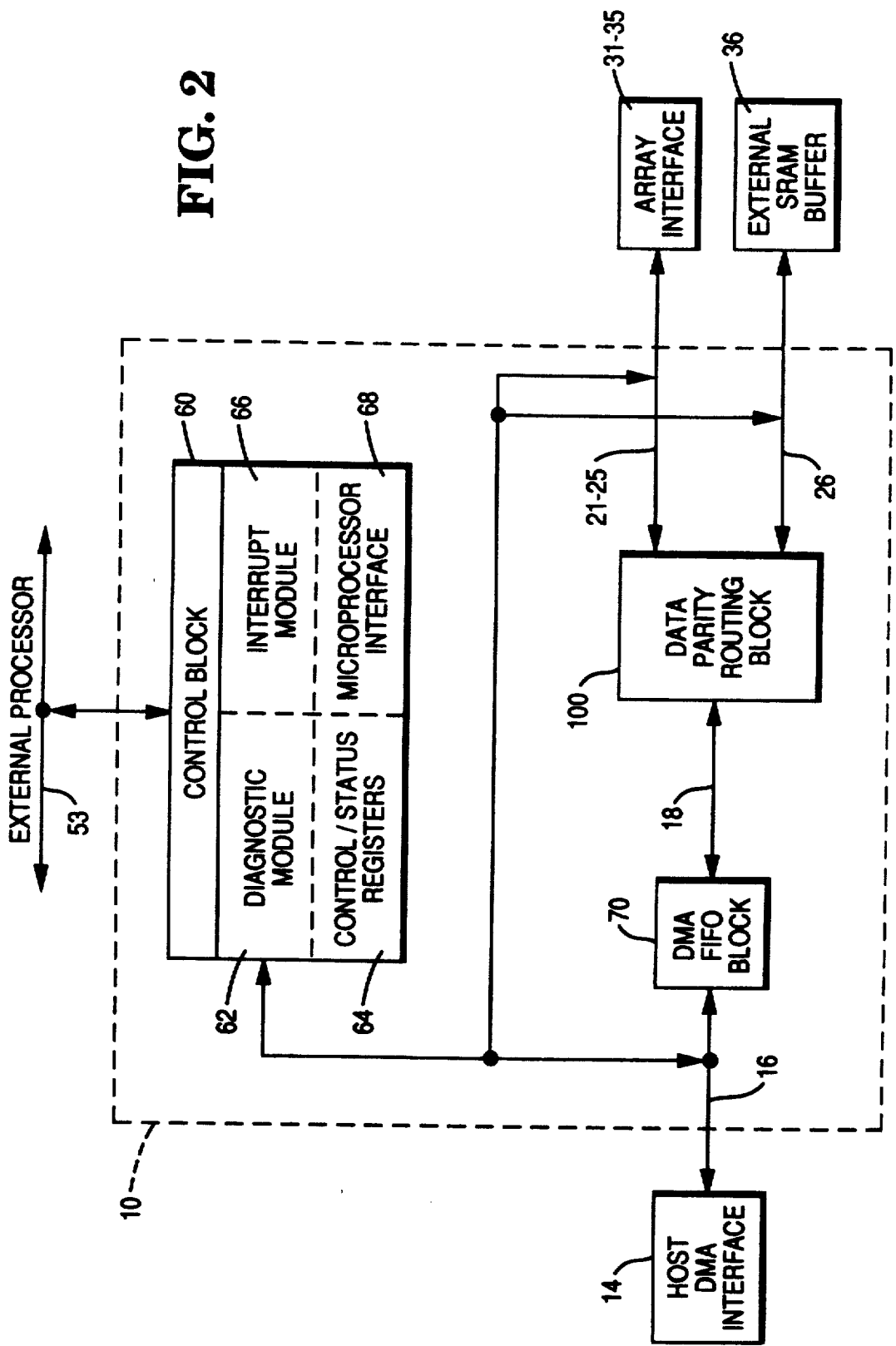
FIG. 2 is a functional block diagram of the SCSI Array Data Path Chip (ADP) shown in FIG. 1 which incorporates the interrupt generation architecture of the present invention.

FIG. 2 is a functional block diagram of the SCSI Array Data Path Chip (ADP) shown in FIG. 1. The ADP chip consists of the following internal functional blocks: control logic block 60 including diagnostic module 62, configuration control and status register module 64, interrupt module 66 and interface module 68; DMA FIFO block 70; and data and parity routing block 100.

The main function of control block 60 is to configure and to test the data path and parity path described in herein. Microprocessor interface module 68 contains basic microprocessor read and write cycle control logic providing communication and data transfer between microprocessor 51 (shown in FIG. 1) and control and status registers within the control block. This interface utilizes a multiplexed address and data bus standard wherein microprocessor read and write cycles consist of an address phase followed by a data phase. During the address phase a specific register is selected by the microprocessor. During the following data phase, data is written to or read from the addressed register.

Configuration control and status register module 64 includes numerous eight-bit registers under the control of microprocessor interface module 68 as outlined above. The contents of the control registers determine the configuration of the data and parity paths. Status registers provide configuration and interrupt information to the microprocessor.

Diagnostic module 62 includes input and output data registers for the host and each array channel. The input registers are loaded by the processor and provide data to host bus 16, array busses 21 through 25 and SRAM bus 26 to emulate host or array transfers. The output registers, which are loaded with data routed through the various data buses, are read by the microprocessor to verify the proper operation of selected data and parity path configurations.

Interrupt module 66 contains the control logic necessary to implement masking and grouping of ADP chip and individual channel interrupt signals. Any combination of five channel interrupt signals received from the disk controllers associated with channels one through five and three internally generated ADP parity error interrupt signals can be combined together to generate interrupt signals for the microprocessor.

The function of DMA FIFO block 70 is to hold data received from the host until the array is ready to accept the data and to convert the data from eighteen bit bus 16 to nine bit busses 18. During read operations DMA FIFO block 70 holds the data received from the disk array until the host system is ready to accept the data and converts the data from nine-bit busses 18 to eighteen bit bus 16.

Data and parity routing block 100 contains the steering logic for configuring the data and parity paths between the host, the disk array and SRAM 36 in response to control bytes placed into the control registers contained in module 64. Block 100 also includes logic for generating and checking parity and reconstructing data lost due to a single disk drive failure.

Figure 3:
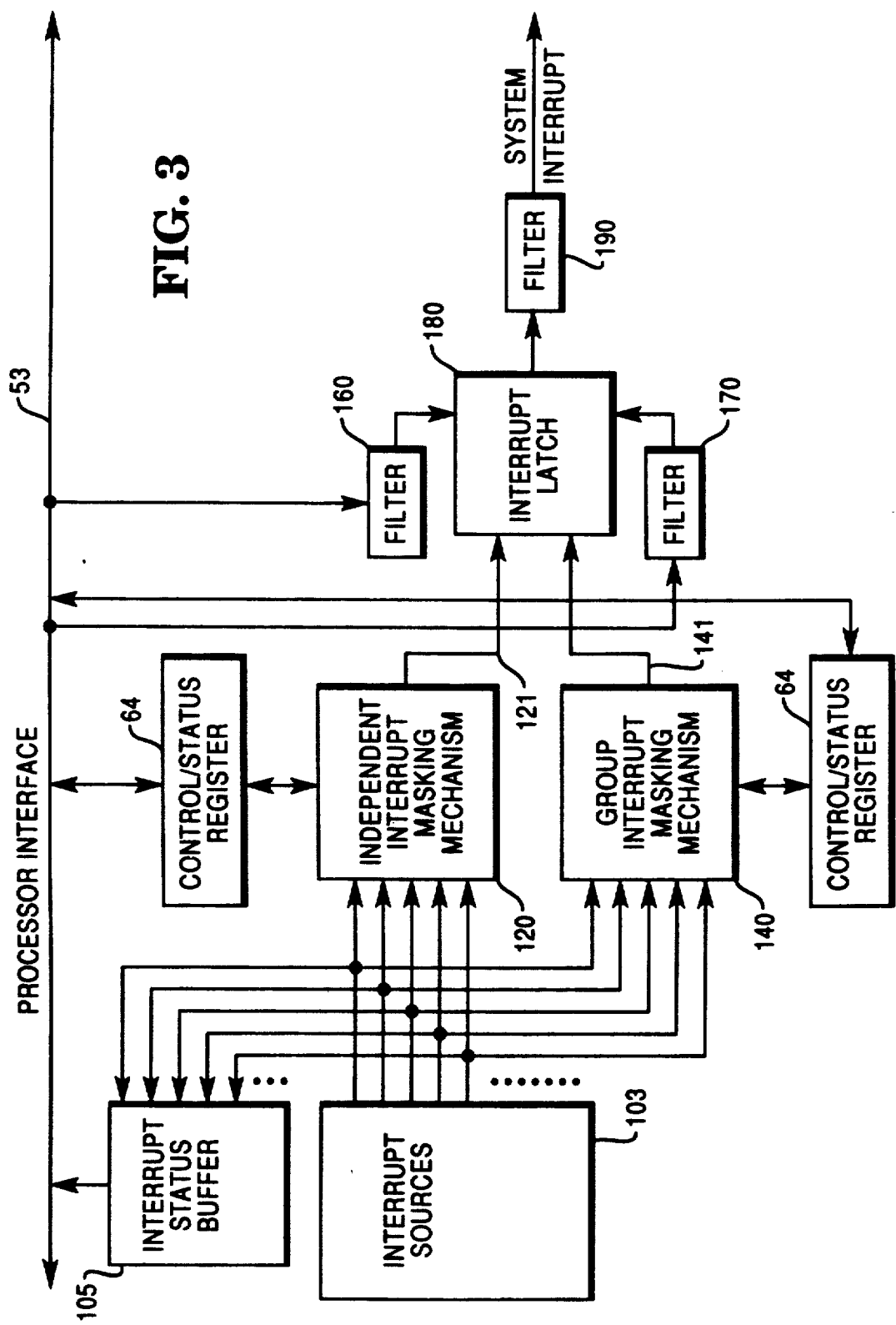
FIG. 3 is a functional block diagram of the interrupt module shown in FIG. 2, representing a preferred embodiment of the present invention.

FIG. 3 is a functional block diagram of interrupt module 66 shown in FIG. 2, representing a preferred embodiment of the present invention. The architecture disclosed includes two masking switches identified as independent interrupt masking mechanism 120 and group interrupt masking mechanism 140, connected to receive an interrupt signal from each array channel. The interrupt signals are shown as being provided by block 103, titled interrupt sources. Block 103 may also include interrupt signal sources other than the array channels, such as parity error detectors.

Independent interrupt masking mechanism 120 is configured internally in response to control signals received from control/status register module 64, discussed above, to combine the signals received from interrupt sources 103 into a single independent interrupt signal on line 121. Similarly, group interrupt masking mechanism 140 is configured internally in response to control signals received from control/status register module 64 to combine the signals received from interrupt sources 103 into a single group interrupt signal on line 141. The internal structure and operation of masking switches 120 and 140 will be discussed in greater detail below with reference to FIGS. 4 and 5.

The outputs of masking switches 120 and 140 are provided to an interrupt latch 180 which holds the system interrupt signal, generated by combining the outputs of masking switches 120 and 140, during a masking time window, explained below, and passes the system interrupt signal at all other times. The interrupt latch is controlled by two front-end filters 160 and 170, referred to as the independent interrupt filter and the group interrupt filter, respectively. Filters 160 and 170 operate in response to address decode signals received from microprocessor 51. The output of latch 180 is provided to a back-end filter 190, also referred to as the system interrupt filter, the output of which provides the "filtered" system interrupt signal for the array.

The internal construction of independent interrupt masking mechanism 120 is shown in detail in the schematic diagram of FIGS. 4A through 4F. The independent interrupt masking mechanism includes eight two-input NAND gates, identified by reference numerals 421 through 428. Each one of NAND gates 421 through 428 is connected to receive an interrupt signal from an array channel or other interrupt signal source via one of input lines 401 through 408, respectively. More particularly, each one of gates 421 through 425 receives an interrupt signal from one of the corresponding array channels 1 through 5, while gates 426 through 428 receive a parity error interrupt signal, a memory error interrupt signal and a processor error interrupt signal, respectively.

The remaining inputs of the NAND gates are connected to receive control signals from an eight-bit register 430, each one of NAND gates 421 through 428 being connected to a respective one of the BIT0 through BIT7 register outputs. The BIT0 through BIT7 inputs of register 430 are connected to the processor data bus, shown as bus 53 in FIGS. 1 through 3, to receive control codes, referred to as MASK1 codes, from the controller processor.

The outputs of NAND gates 421 through 428 are provided to an eight-input NAND gate 450. The output of NAND gate 450 is provided to an inverter 460 to form the independent interrupt signal on line 121.

In operation, independent interrupt masking mechanism 120 generates an interrupt signal on line 121 when a non-masked interrupt signal is received from one of the eight interrupt sources connected to lines 401 through 408. Masking of the interrupt signals received from lines 401 through 408 is accomplished by writing a logic 1 to the corresponding one of bits 0 through 7 of control register 430. Each register bit set high provides a logic 0 signal to the input of one of NAND gates 421 through 428, thereby blocking the transmission of the associated interrupt signal to NAND gate 450. NAND gate 450 combines the interrupt signals associated with control register 430 bits which have been set low. The output of NAND gate 450 is inverted to generate the independent interrupt signal.

Figure 4A:
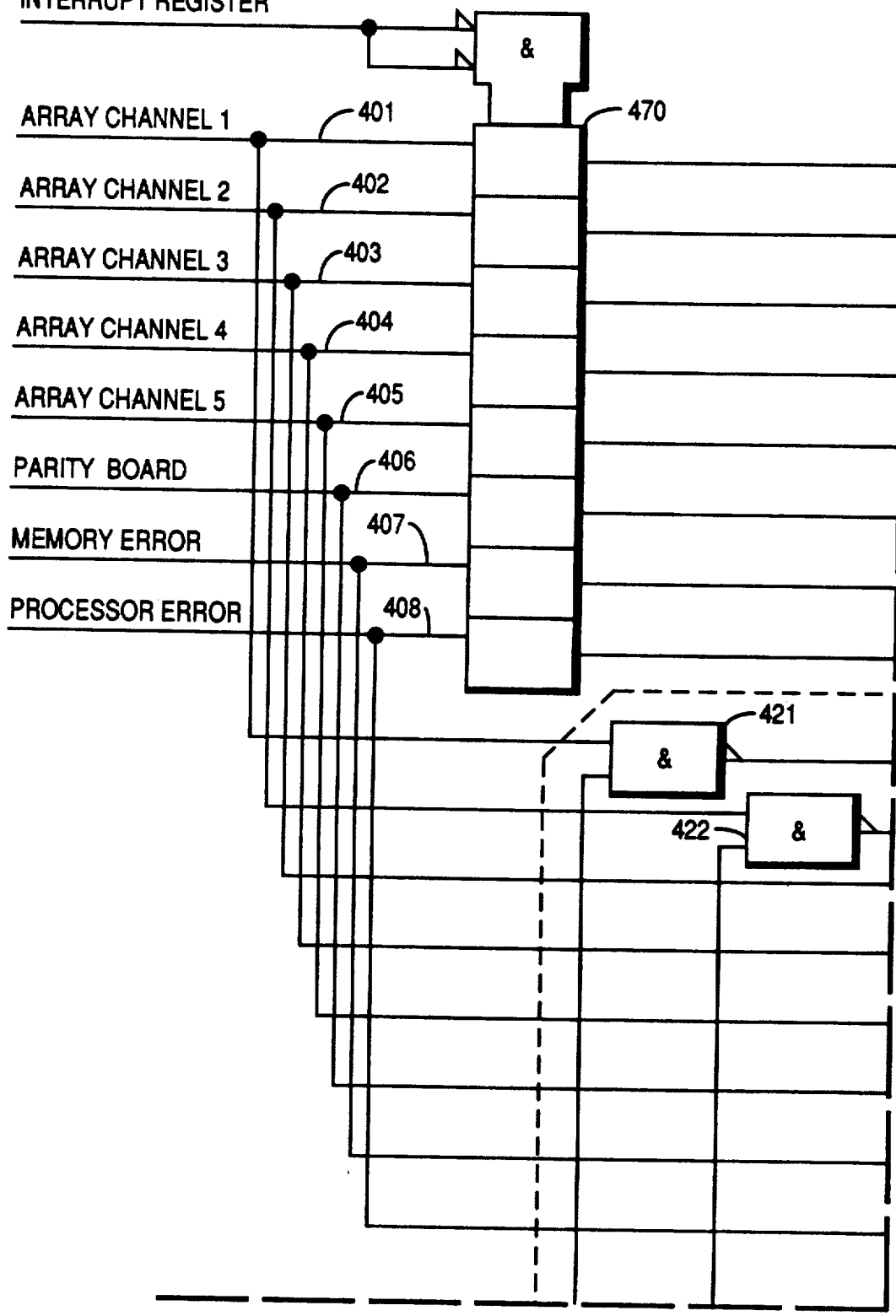
FIGS. 4A through 4F show a schematic diagram of the independent interrupt masking mechanism block shown in FIG. 3.
Figure 4B:
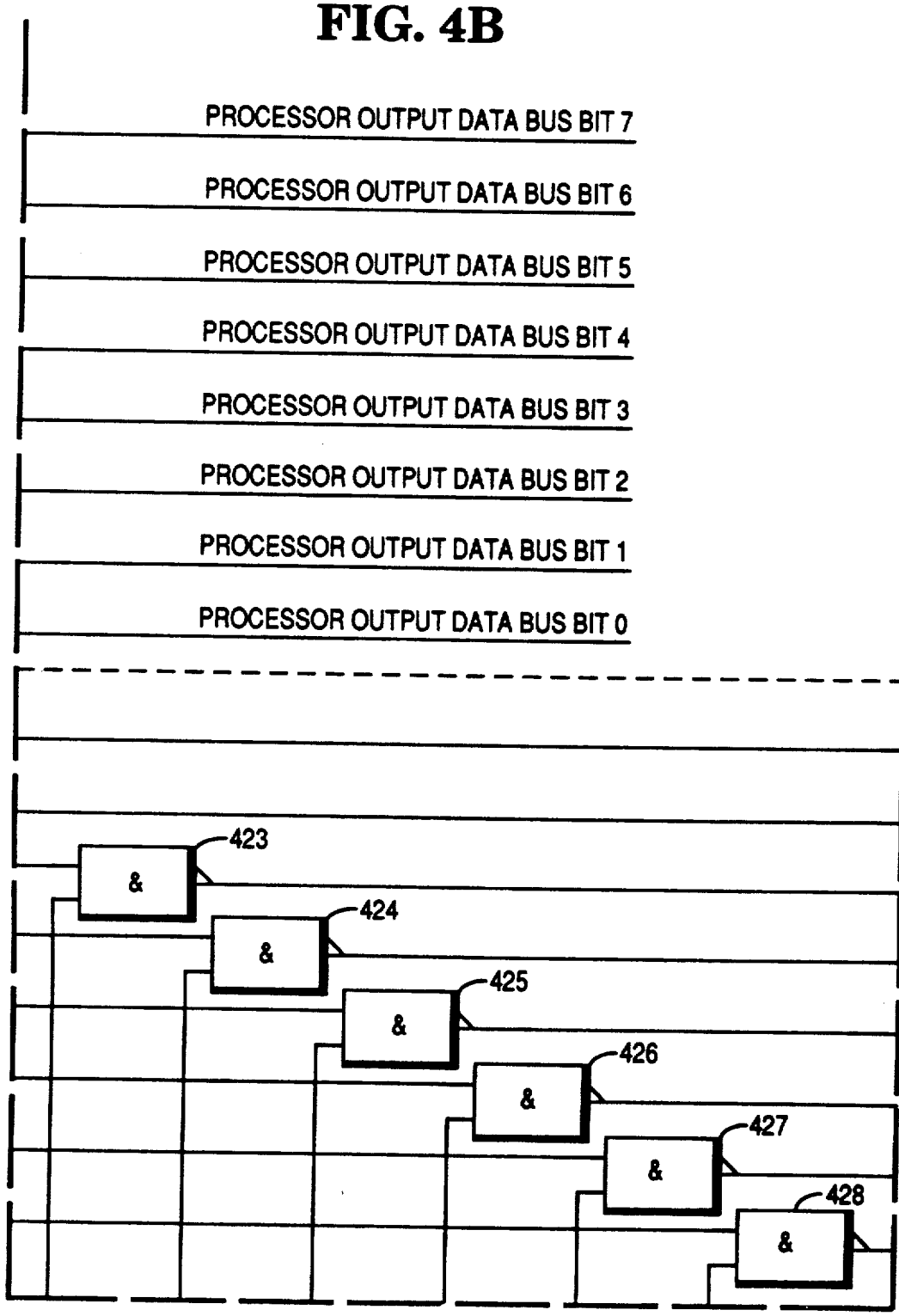
Figure 4:
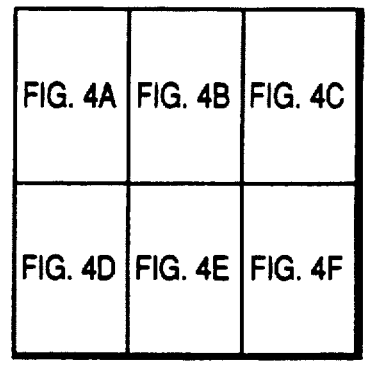
Figure 4C:
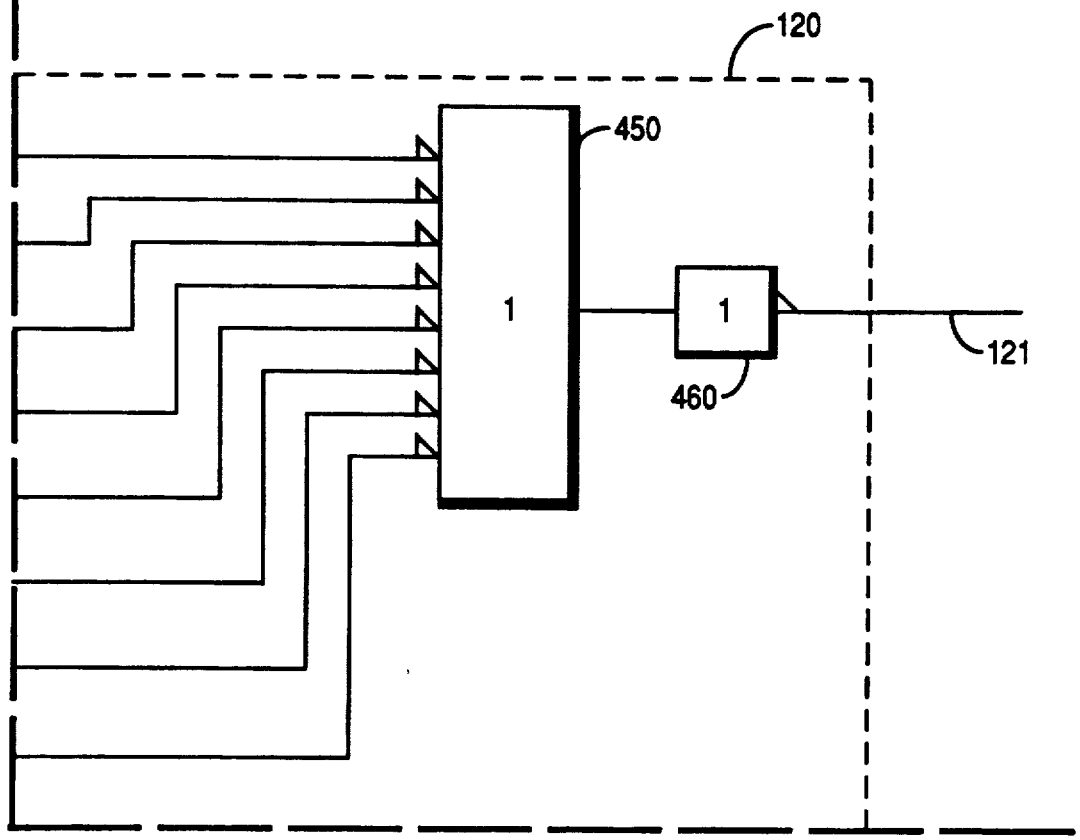
Figure 4D:
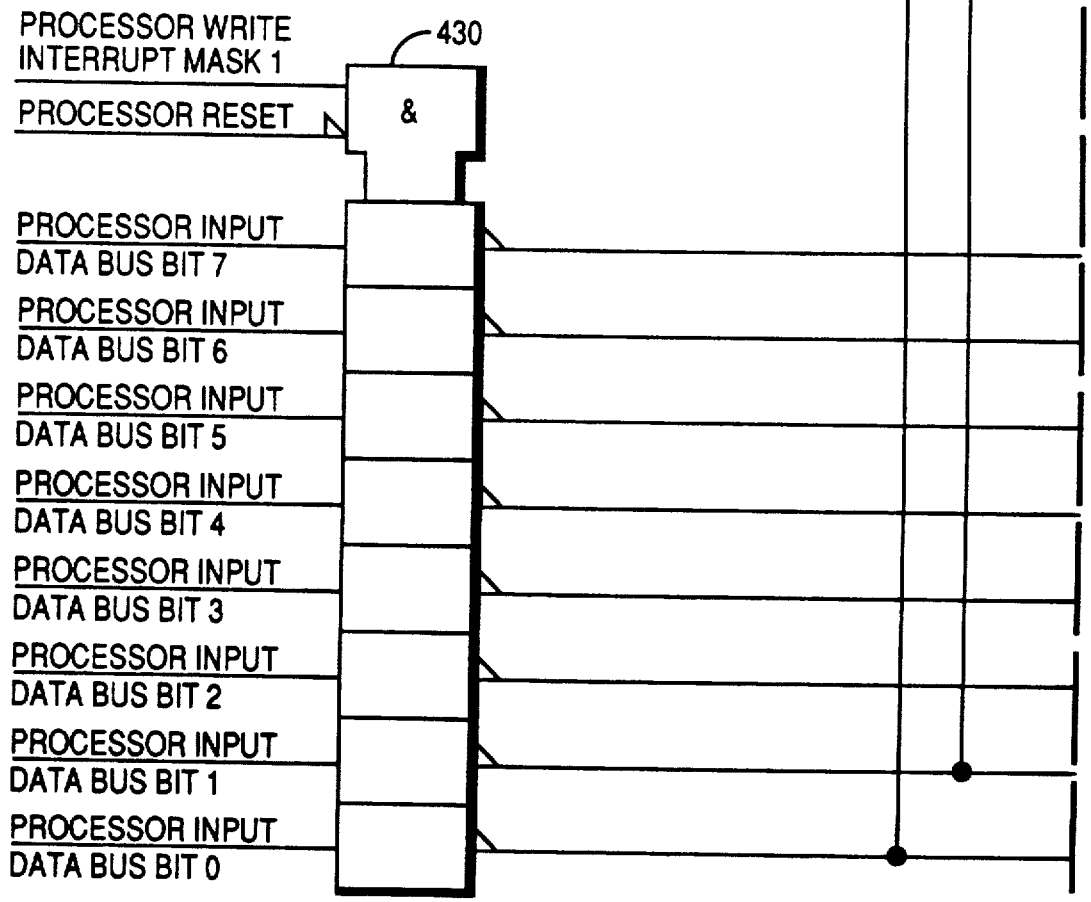
Figure 4E:
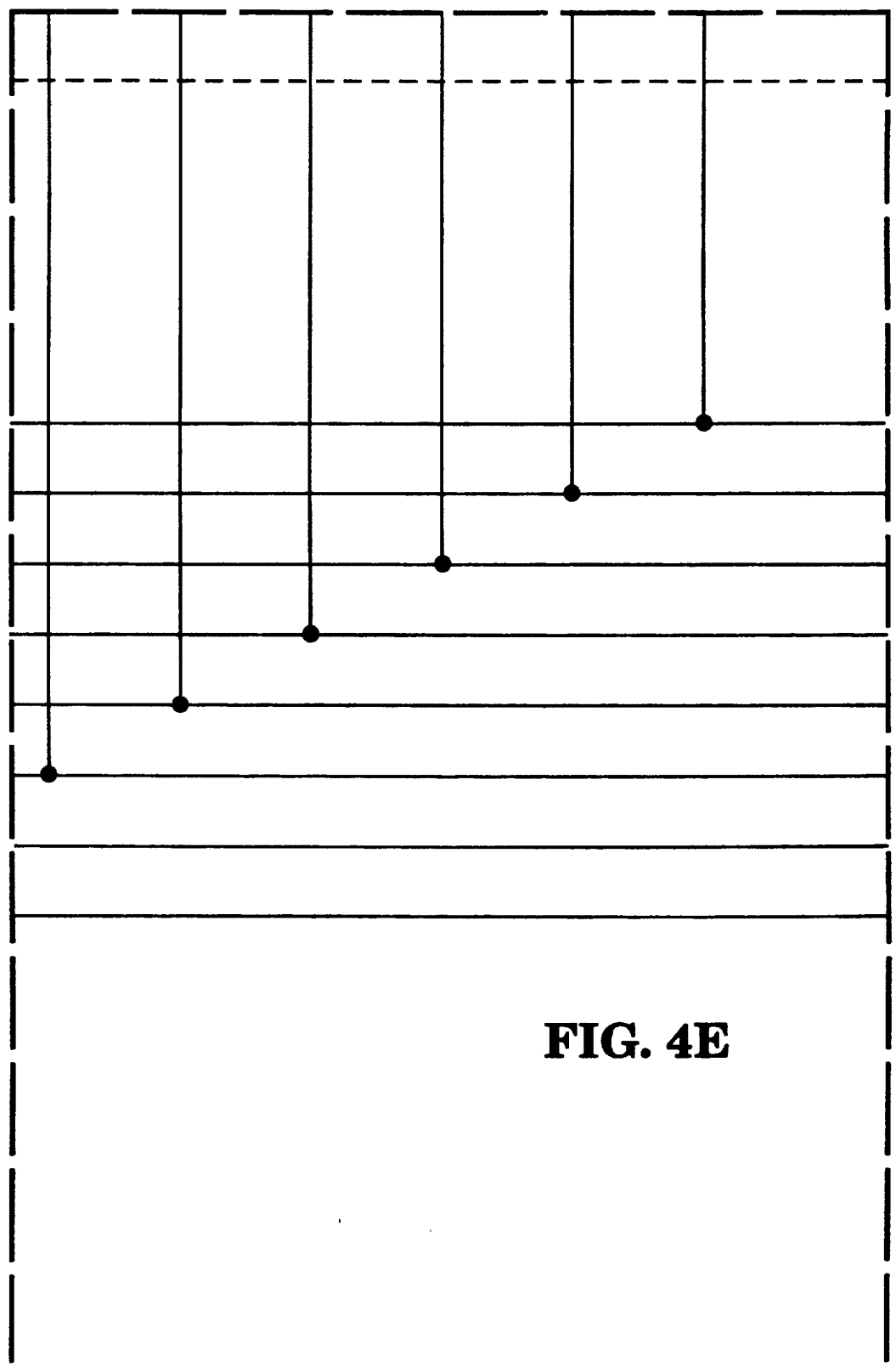
Figure 4F:
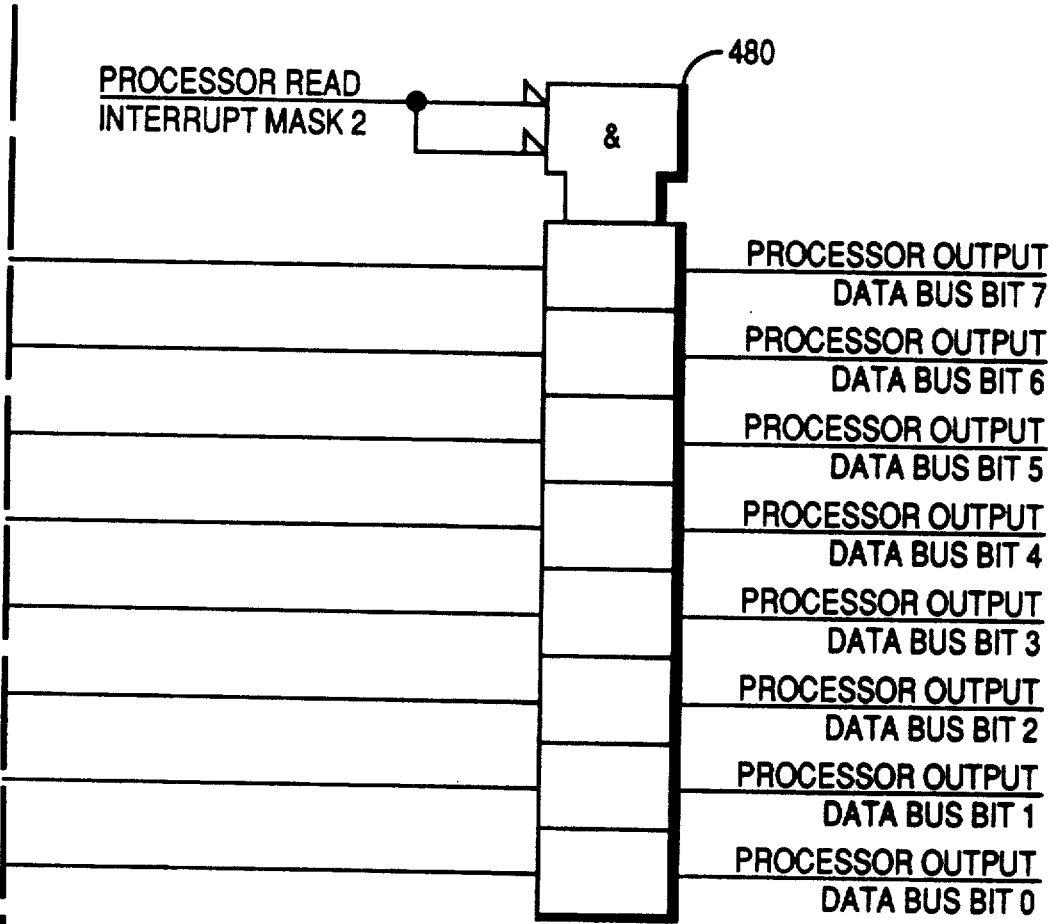

Also shown in FIGS. 4A and 4F are two eight-bit status registers 470 and 480. Interrupt status register 470 is connected to receive the interrupt signals placed on lines 401 through 408 and provide the interrupt signals to processor data bus 53 in response to the receipt of a read interrupt register signal from the controller processor. Independent mask status register 480 is connected to receive the output of control register 430 and provide the control information to processor data bus 53 in response to the receipt of a read interrupt MASK1 signal from the controller processor. Registers 430, 470 and 480 all reside within control/status module 64.

Figure 5A:
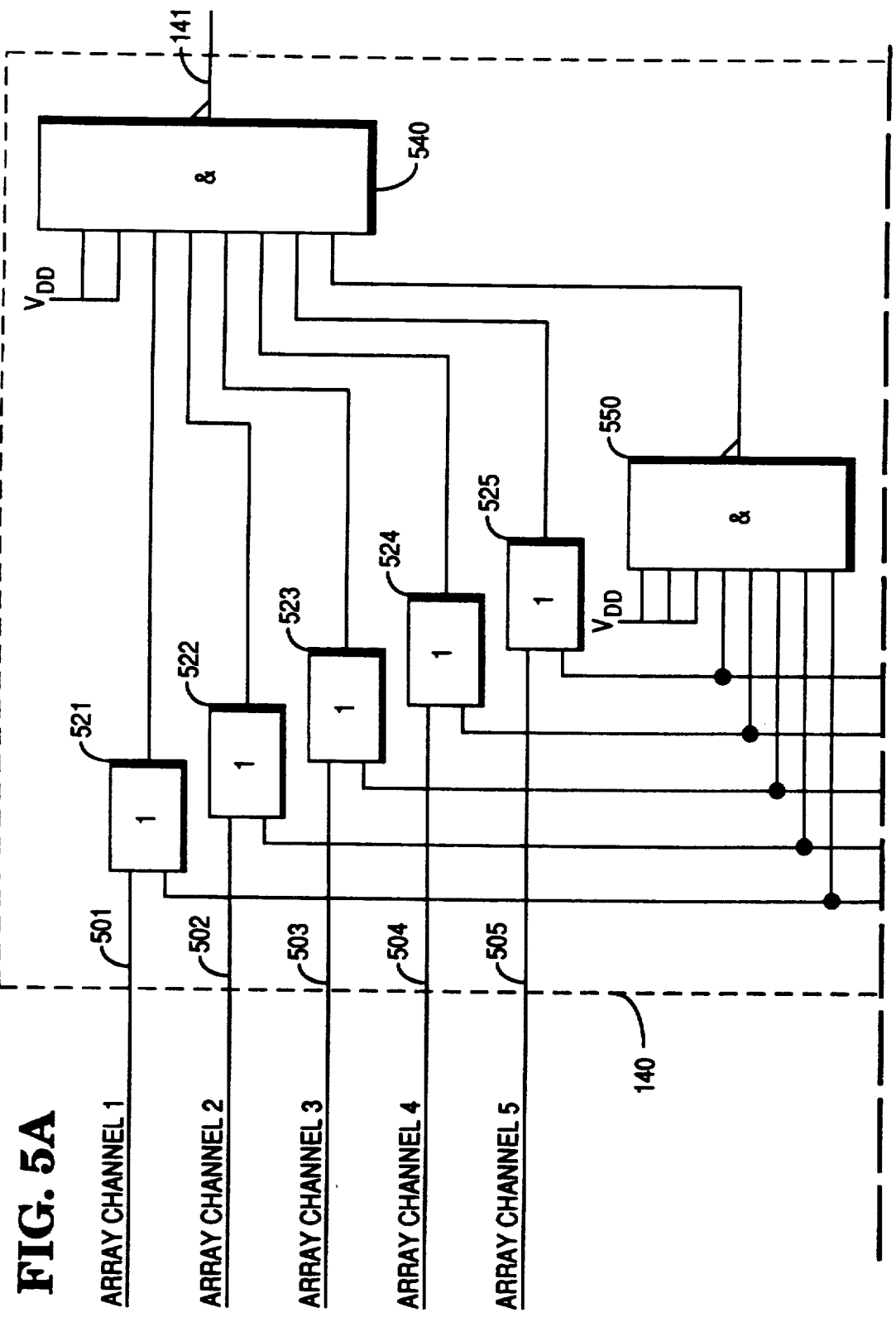
FIGS. 5A and 5B show a schematic diagram of the group interrupt masking mechanism block shown in FIG. 3.
Figure 5B:
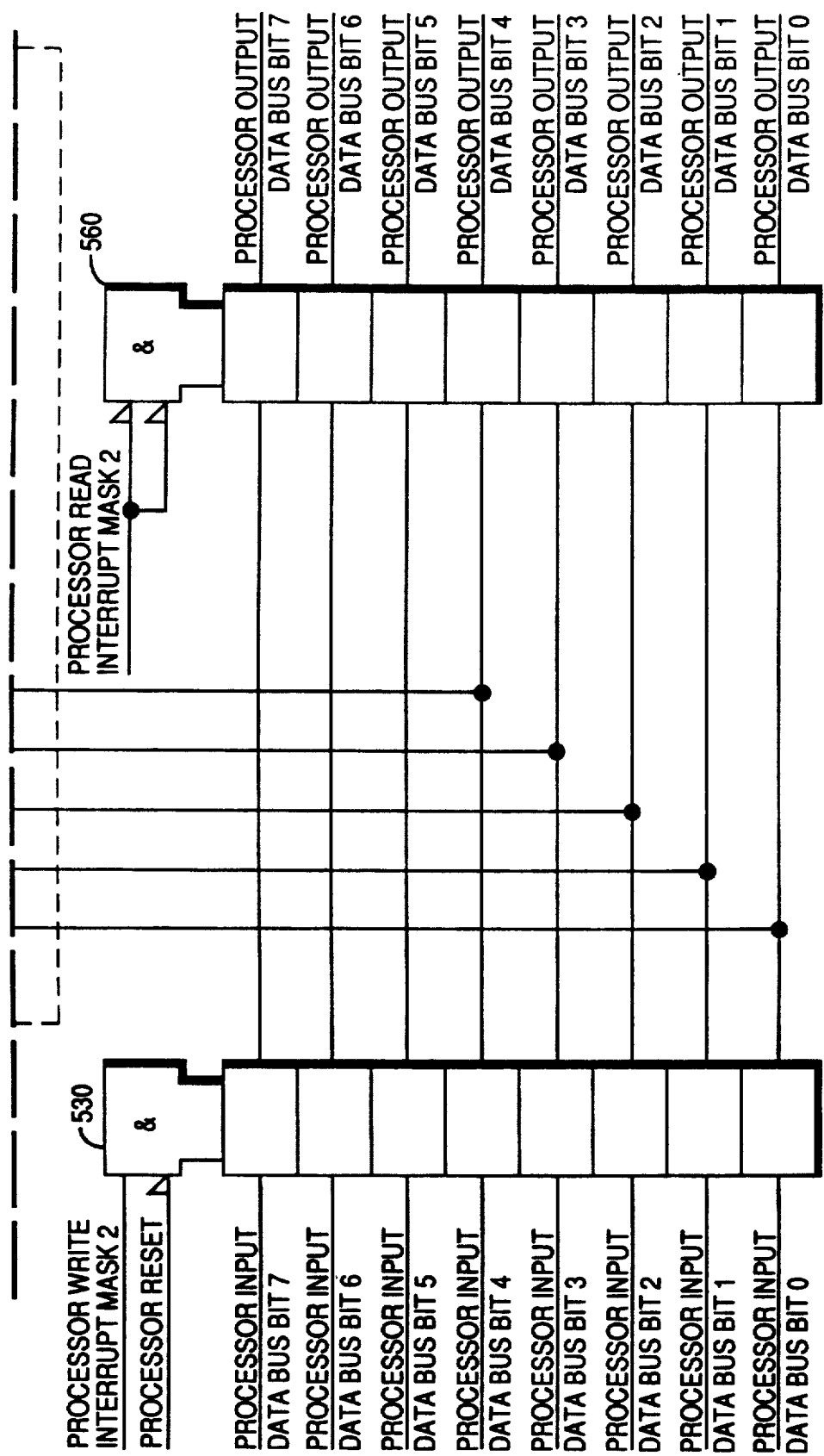

FIGS. 5A and 5B show a schematic diagram of group interrupt masking mechanism 140. The group interrupt masking mechanism includes five OR gates identified by reference numerals 521 through 525. Each gate includes a first input connected to receive a corresponding interrupt signal from array channels 1 through 5 and a second input connected to one of the outputs of eight-bit group mask control register 530. More specifically, OR gate 521 is connected to receive the interrupt signal from array channel 1 via line 501 and the BIT0 output of register 530, gate 522 receives the array channel 2 interrupt signal from line 502 and the BIT1 output of register 530, gate 523 inputs are connected to receive the interrupt signal from array channel 3 and the BIT2 output of register 530, gate 524 inputs are connected to receive the interrupt signal from array channel 4 and the BIT3 output of register 530, and OR gate 525 receives the array channel 5 interrupt signal and the BIT4 output of register 530. The group mask control register inputs are connected to processor bus 53 to receive control codes, referred to as MASK2 codes, from the controller processor.

The outputs of OR gates 521 through 525 are provided to a NAND gate 540, the output of which forms the group interrupt signal on line 141. NAND gate 540 is also connected to receive as input the output of a second NAND gate 550 which combines the BIT0 through BIT4 outputs of register 530.

In operation, group interrupt masking mechanism 140 generates a group interrupt signal on line 141 when interrupt signals are received from all non-masked sources connected to lines 501 through 505. Masking of the interrupt signals received from lines 501 through 505 is accomplished by writing a logic 1 to the corresponding one of bits 0 through 4 of control register 530. Each register bit set high provides a logic 1 signal to the input of one of OR gates 521 through 425, thereby blocking the transmission of the associated interrupt signal to NAND gate 540. NAND gate 540 combines the interrupt signals associated with control register 530 bits which have been set low to generate the group interrupt signal. NAND gate 550, which is connected to receive register 530 bits 0 through 4, disables the operation of gate 540 when control register 530 bits 0 through 4 are all set high.

Also shown in FIG. 5B is group mask status register 560 connected to receive the output of control register 530 and provide the control information stored therein to processor data bus 53 in response to the receipt of a read interrupt MASK2 signal from the controller processor. Registers 530 and 560 both reside within control/status module 64.

Figure 6A:
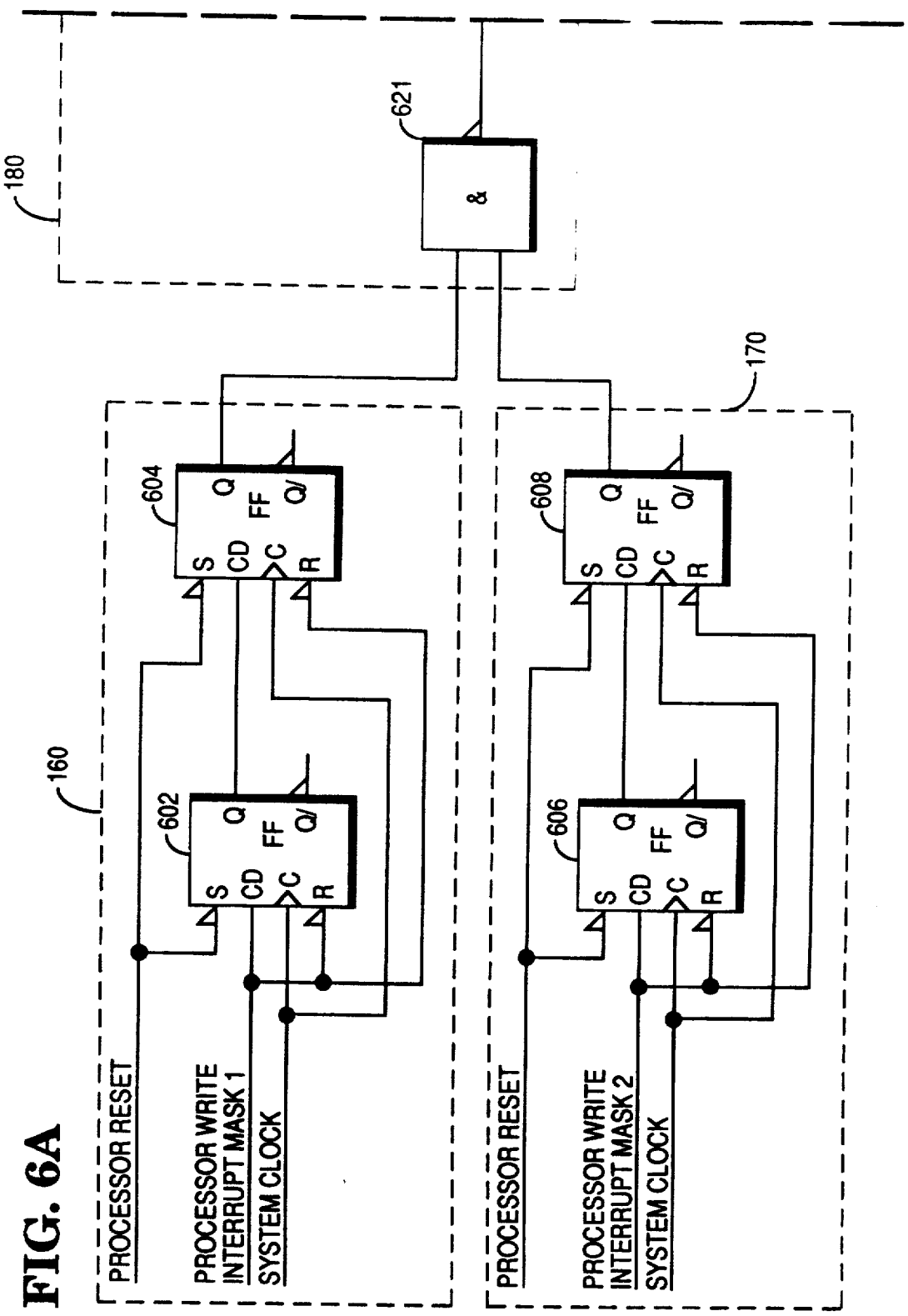
FIGS. 6A and 6B show a schematic diagram of the filter blocks and interrupt latch block shown in FIG. 3.
Figure 6B:
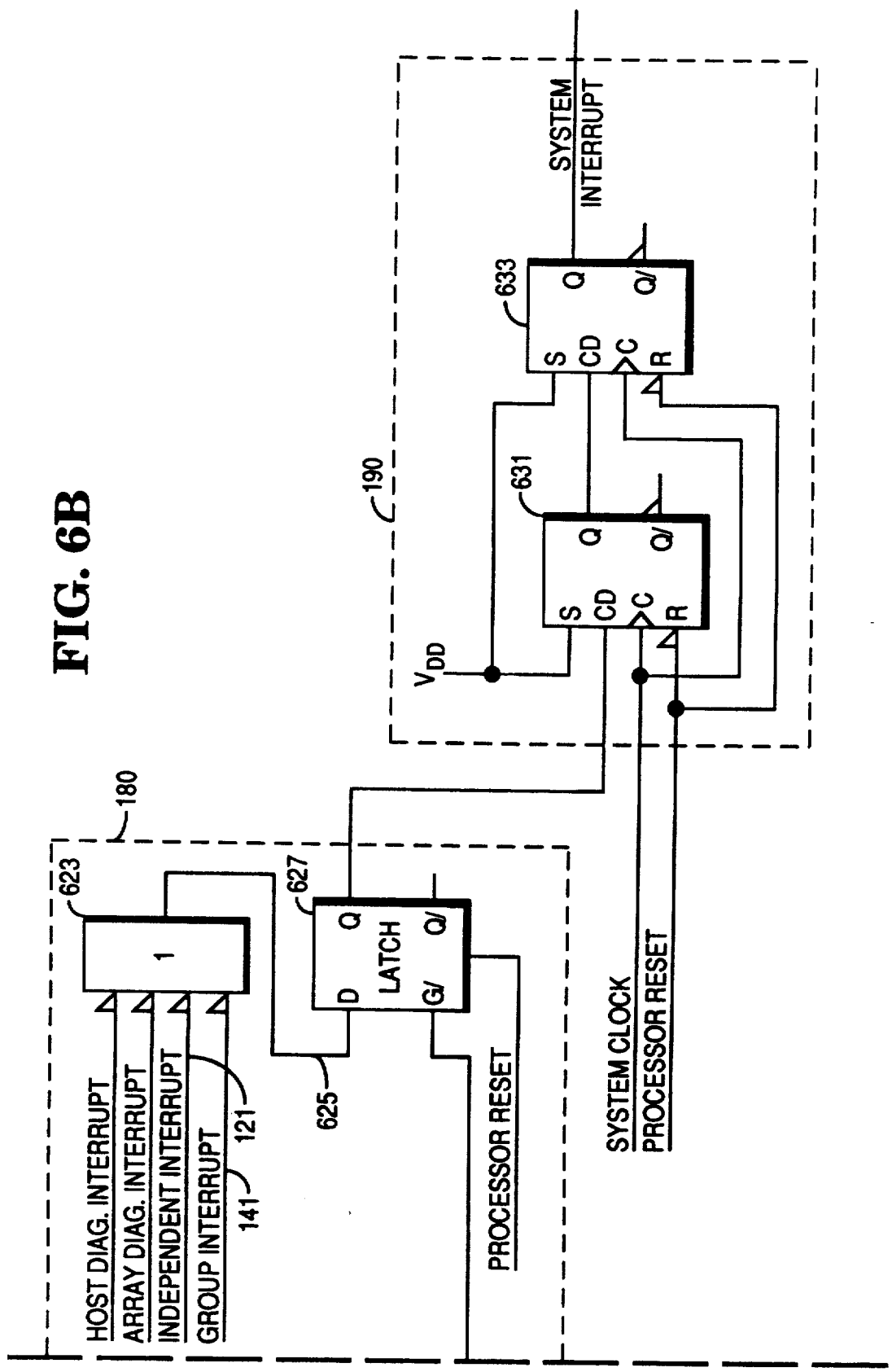

A schematic diagram of independent interrupt filter 160, group interrupt filter 170, interrupt latch 180 and system interrupt filter 190 is provided by FIGS. 6A and 6B. Filter 160 is seen to include a first D-type flip-flop 602 having its preset (S) input connected to receive a processor reset signal, its data (CD) and clear (R) inputs connected to receive the processor write interrupt mask1 signal, and its clock (C) input connected to receive a system clock signal from the host system. The Q output of flip-flop 602 is provided to the data input of a second D-type flip-flop 604 also having its preset input connected to receive the processor reset signal, its clear input connected to receive the processor write interrupt mask1 signal, and its clock input connected to receive the system clock signal. The Q output of flip-flop 604 forms the output of filter 160.

The construction of group interrupt filter 170 is similar to the construction of filter 160. D-type flip-flops 606 and 608 of filter 170 correspond to flip-flops 602 and 604 of filter 160, respectively, however the data and clear inputs of flip-flop 606 and the clear input of flip-flop 608 are connected to receive the processor write interrupt mask2 signal. The output of flip-flop 608 forms the output of filter 170.

Interrupt latch 180 includes an NAND gate 623 having inverting inputs connected to receive the independent interrupt signal from independent interrupt masking mechanism 120, the group interrupt signal from group interrupt masking mechanism 140, and interrupt signals provided by other sources. The combined signal output of gate 623 is provided to the data input of a latch 627. A NAND gate 621 combines the outputs of filters 160 and 170 to produce the control (G) input for latch 627. The Q output of latch 627 forms the output of interrupt latch 180.

System interrupt filter 190 includes two D-type flip-flops identified by reference numerals 631 and 633. Each of flip-flops 631 and 633 has its preset input connected to reference voltage VDD, its clear input connected to receive the processor reset signal, and its clock input connected to receive the system clock signal. The output of interrupt latch 180 is provided to the data input of flip-flop 631 and the Q output of flip-flop 631 is connected to the data input of flip-flop 633. The Q output of flip-flop 633 forms the system interrupt signal.

Interrupt filters 160 and 170 operate to enable latch 627 to hold the system interrupt signal constant during updating of the contents of the independent interrupt and group interrupt control registers, respectively. The output of filter 160 is immediately set low, operating latch 627 to hold its output constant, when the write interrupt mask1 signal provided to the clear inputs of flip-flops 602 and 604 is set low. The write interrupt mask1 signal is set low during updating of the contents of control register 430. Group interrupt filter 170 operates latch 627 to hold its output constant whenever the write group mask2 is set low. The write group mask2 signal is set low during updating of the contents of control register 530. Interrupt filters 160 and 170 also synchronize the latch control signal to the system clock, and extend the period of the latch operation for a minimum of one clock cycle after the mask signal is returned to a high state to prevent any interrupt glitches that could be generated during control register updating.

System interrupt filter 190 is provided to synchronize the output of latch 627 to the system clock and remove the asynchronous aspect of the output of latch 627 which could result in latch metastability.

It can thus be seen that there has been provided by the present invention a simple method and apparatus for combining the interrupt signals received from the individual disks included in disk array. Disk interrupt signals can be masked individually, permitting selected interrupt signals to pass to the system or controller processor, or interrupt signals can be grouped, such as to generate a signal to inform the processor that an array has completed an operation. The apparatus provides grouping and masking without software assist and can be reconfigured easily to accommodate changes in the array.

Those skilled in the art will recognize that the invention is not limited to the specific embodiments described above and that numerous modifications and changes are possible without departing from the scope of the present invention. For example, the architecture shown can be modified to accommodate a disk array having more or less than the five channels shown.

These and other variations, changes, substitution and equivalents will be readily apparent to those skilled in the art without departing from the spirit and scope of the present invention. Accordingly, it is intended that the invention to be secured by Letters Patent be limited only by the scope of the appended claims.

What is claimed is:

1. Apparatus for generating a system interrupt signal from a disk array, said disk array including a plurality of interrupt signal sources, said apparatus comprising:

means for combining a first group of selected interrupt signals to generate a group interrupt signal, said group interrupt signal having a first binary state when each one of the interrupt signals of said first group has a first binary state and having a second binary state otherwise;

means for combining a second group of selected interrupt signals to generate an independent interrupt signal, said independent interrupt signal having a first binary state when any one of the interrupt signals of said second group has a first binary state and having as second binary state when each one of the interrupt signals of said second group has a second binary value; and means for combining said group interrupt signal and said independent interrupt signal to generate said system interrupt signal, said system interrupt signal having a first binary state when either one of said group interrupt signal or said independent interrupt signals has a first binary state and having a second binary state when each of said group and independent interrupt signals has a second binary state.

2. The apparatus according to claim 1, wherein:

said means for combining said first group of selected interrupt signals comprises a plurality of OR gates wherein each one of said plurality of OR gates corresponds to one of said plurality of interrupt signal sources, each one of said plurality of OR gates having a first input for receiving an interrupt signal from its corresponding interrupt signal source and a second input for receiving a mask code; and a first NAND gate connected to receive the output of said plurality of OR gates, the output of said first NAND gate providing said group interrupt signal;

said means for combining said second group of selected interrupt signals comprises a plurality of NAND gates wherein each one of said plurality of NAND gates corresponds to one of said plurality of interrupt signal sources, each one of said plurality of NAND gates having a first input for receiving an interrupt signal from its corresponding interrupt signal source and a second input for receiving a mask code; and a second NAND gate connected to receive the outputs of said plurality of NAND gates, the output of said second NAND gate providing said independent interrupt signal; and said means for combining said group interrupt signal with said independent interrupt signal comprises a third NAND gate having a first input connected to receive said group interrupt signal and a second input connected to receive said independent interrupt signal, the output of said third NAND gate providing said system interrupt signal.

3. The apparatus according to claim 1, further comprising means connected to receive said system interrupt signal and a system clock signal for synchronizing said system interrupt signal to said system clock signal.

4. The apparatus according to claim 3, wherein said synchronizing means comprises a D-type flip-flop having its data input connected to receive said system interrupt signal and its clock input connected to receive said system clock signal.

5. The apparatus according to claim 1, wherein:
said means for combining said first group includes first masking means connected to said interrupt sources for receiving interrupt signals and connected to receive a first mask code, said first masking means for selecting said first group of interrupt signals in response to said first mask code; and
said means for combining said second group includes second masking means connected to said interrupt sources for receiving interrupt signals and connected to receive a second mask code, said second masking means for selecting said second group of interrupt signals in response to said second mask code.

6. The apparatus according to claim 5, further comprising means connected to receive said system interrupt signal for latching said system interrupt signal during updating of said first and second mask codes.

7. The apparatus according to claim 6, wherein said means for latching said system interrupt signal comprises:
means connected to receive a first write mask signal indicating the writing of said first mask code to said first masking means and a second write mask signal indicating the writing of said second mask code to said second masking means to generate a latch enable signal, said latch enable signal having a first binary state when any one of said first or second write mask signals has a first binary state; and
an interrupt latch having a data input connected to receive said system interrupt signal and an enable input connected to receive said latch enable signal.

8. The apparatus according to claim 7, further comprising a system interrupt filtering means having a clock input connected to a system clock and having a data input connected to the output of said interrupt latch to guarantee synchronization between said output of said interrupt latch and said system clock.

9. Apparatus for generating a system interrupt signal from a disk array, said disk array including a plurality of interrupt signal sources, said apparatus comprising:
a first mask control register having a clock input for receiving a first write mask signal and inputs for receiving a first mask code, said first mask control register enabled to receive said first mask code when said first write mask signal is applied to said clock input;
first combining means connected to said interrupt sources for receiving interrupt signals and connected to said first mask control register for receiving said first mask code, said first combining means for combining a first group of interrupt signals selected in response to said first mask code to generate a group interrupt signal, said group interrupt signal having a first binary state when each one of the interrupt signals of said first group has a first binary state and having a second binary state otherwise;
a second mask control register having a clock input for receiving a second write mask signal and inputs for receiving a second mask code, said second mask control register enabled to receive said second mask code when said second write mask signal is applied to said clock input;
second combining means connected to said interrupt sources for receiving interrupt signals and connected to said second mask control register for receiving said second mask code, said second combining means for combining a second group of interrupt signals selected in response to said second mask code to generate an independent interrupt signal, said independent interrupt signal having a first binary state when any one of the interrupt signals of said second group has a first binary state and having a second binary state when each one of the interrupt signals of said second set has a second binary value; and
means for combining said group interrupt signal and said independent interrupt signal to generate said system interrupt signal, said system interrupt signal having a first binary state when either one of said group interrupt signal or said independent interrupt signals has a first binary state and having a second binary state when each of said group and independent interrupt signals has a second binary state.

10. The apparatus according to claim 9, further comprising:
an interrupt latching means connected to receive said system interrupt signal for latching said system interrupt signal as an output during writing of said first mask code to said first mask control register or during writing of said second mask code to said second mask control register; and
a system interrupt filter means connected to receive said output of said interrupt latching means and connected to receive a system clock signal for synchronizing said output of said interrupt latching means to said system clock signal.

11. The apparatus according to claim 10, wherein said interrupt latching means comprises:
a first filter including a first D-type flip-flop having its data and clear inputs connected to receive said first write mask signal and its clock input connected to receive said system clock signal; a second D-type flip-flop having its data input connected to the output of said first D-type flip-flop, its clock input connected to receive said system clock signal and its clear input connected to receive said first write mask signal;
a second filter including a third D-type flip-flop having its data and clear inputs connected to receive said second write mask signal and its clock input connected to receive said system clock signal; a fourth D-type flip-flop having its data input connected to the output of said third D-type flip-flop, its clock input connected to receive said system clock signal and its clear input connected to receive said second write mask signal;
a NAND gate having a first input connected to receive the output of said second D-type flip-flop and a second input connected to receive the output of said fourth D-type flip-flop; and a latch having its data input connected to receive said system interrupt signal and its enable input connected to receive the output of said NAND gate.

12. The apparatus according to claim 10, wherein said synchronizing means comprises:
- a first D-type flip-flop having its data input connected to receive said output of said interrupt latching means and its clock input connected to receive said system clock signal; and
- a second D-type flip-flop having its data input connected to receive the output of said first D-type flip-flop and its clock input connected to receive said system clock signal.

13. Apparatus for generating a group interrupt signal from a disk array, said disk array including a plurality of interrupt signal sources, said apparatus comprising:
- masking means connected to said interrupt sources for receiving interrupt signals and connected to receive a mask code, said masking means for selecting a group of interrupt signals in response to said mask code, said masking means comprising a plurality of OR gates wherein each one of said plurality of OR gates corresponds to one of said plurality of interrupt signal sources, each one of said plurality of OR gates having a first input for receiving an interrupt signal from its corresponding interrupt signal source and a second input for receiving a portion of said mask code; and
- means for combining said group of selected interrupt signals to generate said group interrupt signal, said group interrupt signal having a first binary state when each one of the interrupt signals of said group has a first binary state and having a second binary state otherwise, said means for combining comprising a NAND gate connected to receive the outputs of said plurality of OR gates, the output of said NAND gate providing said group interrupt signal.

14. Apparatus for generating an independent interrupt signal from a disk array, said disk array including a plurality of interrupt signal sources, said apparatus comprising:
- masking means connected to said interrupt sources for receiving interrupt signals and connected to receive a mask code, said masking means for selecting a group of interrupt signals in response to said mask code, said masking means comprising a plurality of NAND gates wherein each one of said plurality of NAND gates corresponding corresponds to one of said plurality of interrupt signal sources, each one of said plurality of NAND gates having a first input for receiving an interrupt signal from its corresponding interrupt signal source and a second input for receiving a portion of said mask code; and
- means for combining said group of selected interrupt signals to generate an independent interrupt signal, said independent interrupt signal having a first binary state when any one of the interrupt signals of said group has a first binary state and having a second binary state when each one of the interrupt signals of said group has a second binary value, said means for combining comprises a NAND gate connected to receive the outputs of said plurality of NAND gates, wherein the output of said NAND gate is inverted to provide said independent interrupt signal.

15. A method for generating a system interrupt signal from a disk array, said disk array including a plurality of interrupt signal sources, said method comprising the steps of:
- combining a first group of selected interrupt signals provided by said interrupt signal sources to generate a group interrupt signal, said group interrupt signal having a first binary state when each one of the interrupt signals of said first group has a first binary state and having a second binary state otherwise;
- combining a second group of selected interrupt signals provided by said interrupt signal sources to generate an independent interrupt signal, said independent interrupt signal having a first binary state when any one of the interrupt signals of said second group has a first binary state and having a second binary state when each one of the interrupt signals of said second set has a second binary value; and
- combining said group interrupt signal and said independent interrupt signal to generate said system interrupt signal, said system interrupt signal having a first binary state when either one of said group interrupt signal or said independent interrupt signals has a first binary state and having a second binary state when each of said group and independent interrupt signals has a second binary state.

16. The method according to claim 15, further comprising the step of synchronizing said system interrupt signal with a system clock signal.

17. The method according to claim 14, further comprising the step of filtering said system interrupt signal to remove any asynchronous aspect within said system interrupt signal.

* * * * *